(12) United States Patent
Robbin

(10) Patent No.: US 9,688,478 B2
(45) Date of Patent: Jun. 27, 2017

(54) CONVEYOR UNIT AND CONVEYOR SYSTEM FOR CONVEYING VEHICLE BODIES AND PLANT FOR MACHINING VEHICLE BODIES

(75) Inventor: Joerg Robbin, Ammerbuch (DE)

(73) Assignee: EISENMANN SE, Boeblingen (DE)

( * ) Notice: Subject to any disclaimer, the term of this patent is extended or adjusted under 35 U.S.C. 154(b) by 250 days.

(21) Appl. No.: 13/821,767

(22) PCT Filed: Aug. 19, 2011

(86) PCT No.: PCT/EP2011/004179
§ 371 (c)(1),
(2), (4) Date: Apr. 24, 2013

(87) PCT Pub. No.: WO2012/031680
PCT Pub. Date: Mar. 15, 2012

(65) Prior Publication Data
US 2013/0199893 A1     Aug. 8, 2013

(30) Foreign Application Priority Data

Sep. 10, 2010     (DE) .................. 10 2010 045 010

(51) Int. Cl.
*B65G 35/06*     (2006.01)
*B65G 21/22*     (2006.01)
(Continued)

(52) U.S. Cl.
CPC .......... *B65G 35/06* (2013.01); *B05B 13/0221* (2013.01); *B62D 65/18* (2013.01);
(Continued)

(58) Field of Classification Search
CPC   B65G 21/22; B65G 35/06; B65G 2201/0294; B65G 35/00;
(Continued)

(56) References Cited

U.S. PATENT DOCUMENTS 4,646,915 A * 3/1987 Ohtaki ................... B62D 65/18
198/346
5,127,336 A * 7/1992 Wakabayashi ............. B61J 1/10
104/243

(Continued)

FOREIGN PATENT DOCUMENTS

DE    20 2008 010 202 U1    2/2010
WO    2009/000512 A2    12/2008
WO    2009/024696 A1    2/2009

*Primary Examiner* — Gerald McClain
*Assistant Examiner* — Keith R Campbell
(74) *Attorney, Agent, or Firm* — Factor Intellectual Property Law Group, Ltd.

(57) ABSTRACT

A conveyor unit which can be displaced for conveying vehicle bodies and which includes a bogie assembly and a coupling device which is connected to the bogie assembly and which is configured such that it interacts with the base areas of the vehicle body which are upwardly orientated to the roof. Also a conveyor system having at least one conveyor unit of such type and a plant for machining vehicle bodies. Vehicle bodies are conveyed by a conveyor system between and/or in machining stations, said plant also including such a conveyor system.

11 Claims, 9 Drawing Sheets

(51) Int. Cl.
  *B05B 13/02* (2006.01)
  *B62D 65/18* (2006.01)
  *B05B 13/04* (2006.01)

(52) U.S. Cl.
  CPC .......... *B65G 21/22* (2013.01); *B05B 13/0452* (2013.01); *B65G 2201/0294* (2013.01)

(58) Field of Classification Search
  CPC ........ B65G 2201/0294; B05B 13/0221; B05B 13/0452; B62D 65/18
  USPC ......... 198/343.1, 343.2, 345.3, 346.3, 463.3, 198/465.1, 465.2, 468.6, 468.9, 621.1, 198/621.2, 621.3
  See application file for complete search history.

(56) References Cited

U.S. PATENT DOCUMENTS

| | | | |
|---|---|---|---|
| 5,322,156 A | 6/1994 | Kakita et al. | |
| 6,196,372 B1* | 3/2001 | Rossi | B62D 65/00 198/345.1 |
| 6,324,992 B1* | 12/2001 | Morikiyo | B61B 13/12 104/165 |
| 6,474,460 B2 | 11/2002 | Di Rosa | |
| 6,494,304 B1* | 12/2002 | Jaynes | B61B 10/025 104/172.1 |
| 6,505,726 B1* | 1/2003 | Baulier | B66F 7/02 198/343.2 |
| 7,134,541 B2* | 11/2006 | Matsubara | B65G 49/0459 198/378 |
| 7,461,733 B2* | 12/2008 | Dohi | B62D 65/18 198/345.1 |
| 8,336,701 B2* | 12/2012 | Ruggaber et al. | 198/345.3 |
| 8,459,438 B2* | 6/2013 | Ooe | B62D 65/18 198/345.1 |
| 8,474,594 B2* | 7/2013 | Robbin et al. | 198/345.3 |
| 9,004,471 B2* | 4/2015 | Ooe | B62D 65/18 254/134 |
| 2006/0032728 A1* | 2/2006 | Smith | B62D 65/18 198/468.6 |
| 2008/0251354 A1* | 10/2008 | Ruggaber | B62D 65/18 198/463.1 |
| 2009/0013524 A1* | 1/2009 | Kodo | B62D 65/18 29/824 |

* cited by examiner

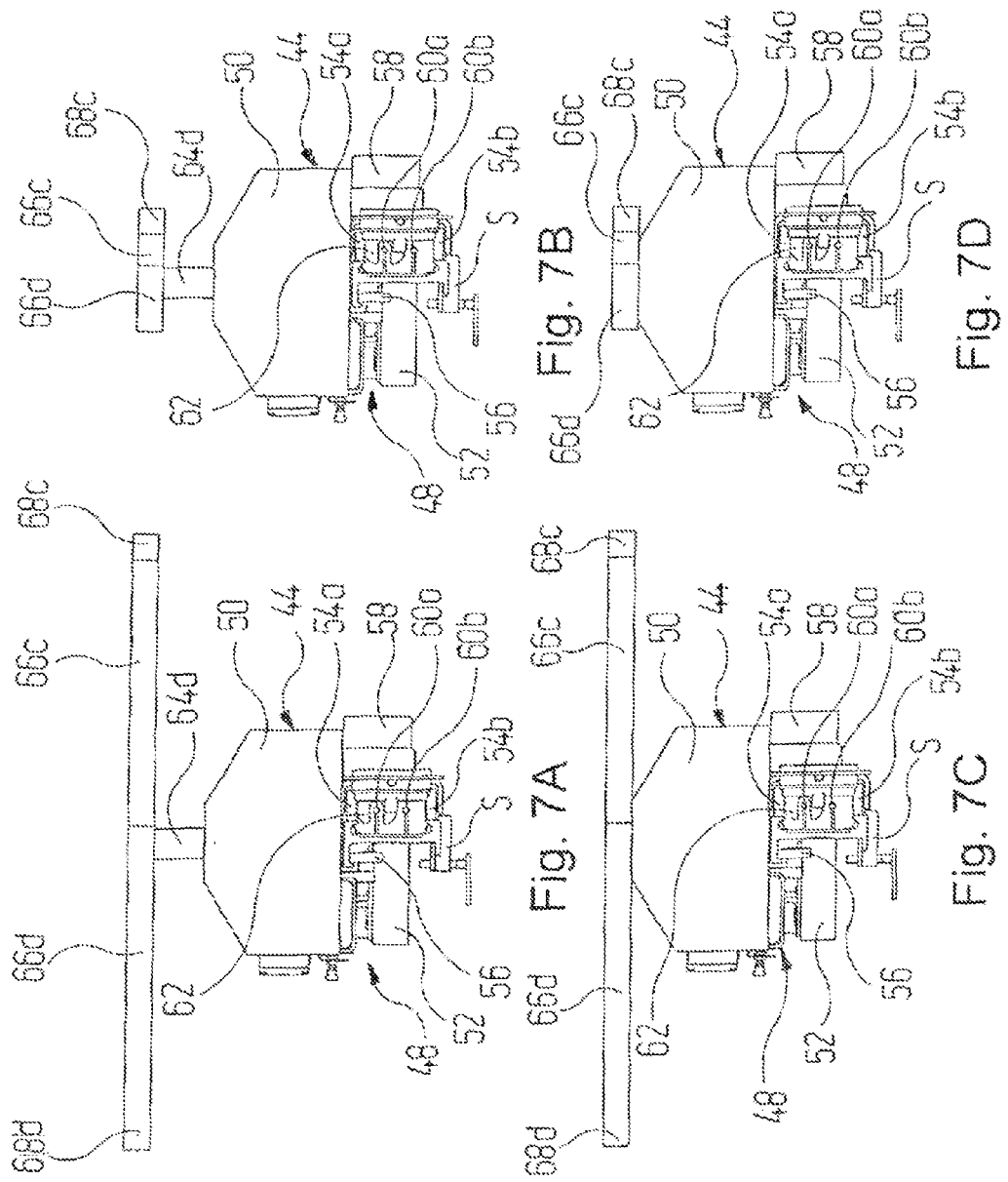

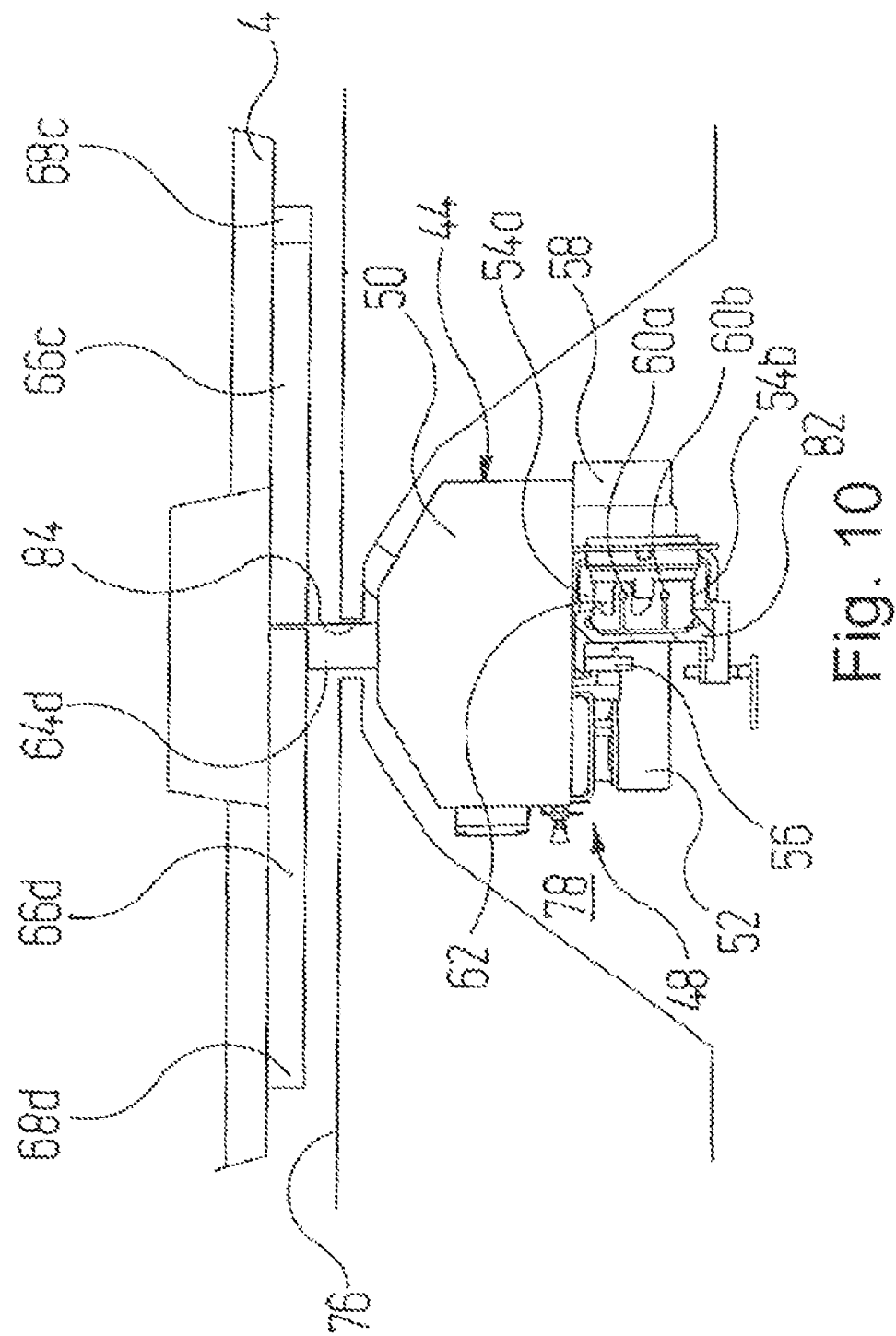

CONVEYOR UNIT AND CONVEYOR SYSTEM FOR CONVEYING VEHICLE BODIES AND PLANT FOR MACHINING VEHICLE BODIES

RELATED APPLICATIONS

This application claims the filing benefit of International Patent Application No. PCT/EP2011/004179, filed Aug. 19, 2011, which claims the filing benefit of German Patent Application No. 10 2010 045 010.3 filed Sep. 10, 2010, the contents of both of which are incorporated herein by reference.

FIELD OF THE INVENTION

The invention relates to a conveyor unit and a conveyor system for conveying vehicle bodies and a plant for treating vehicle bodies, in which vehicle bodies are conveyed between and/or within treatment stations by means of a conveyor system.

BACKGROUND OF THE INVENTION

In addition to a surface treatment, such as cleaning or painting, the term treatment is also used here to refer to any type of process on the vehicle body, for example bodyshell or assembly work.

In commercially known plants for such treatment of vehicle bodies, vehicle bodies to be treated are often conveyed on so-called skids between, and sometimes also in, individual treatment stations. A vehicle body is secured to each skid here, for which the vehicle bodies are produced with standardised holding components. In the case of vehicle bodies, such standardised holding components are known for example in the form of holding plates on the vehicle-body floor which are provided with a respective opening and often cooperate with locking pins on the skids. The skids are transported for example by conveyor units in the form of belt conveyors or roller conveyors, or also by suspended systems, which together form a conveyor system.

It may be that up to 400 and more vehicle bodies are conveyed in a treatment system at the same time, for which a corresponding number of skids and a corresponding network of belt, roller and suspended conveyors or the like is required.

All in all, in the case of known plants of the type mentioned at the outset, a relatively large quantity of steel is used for constructing the skids and their drive. This increases the total cost of such a treatment plant.

An object of the invention, therefore, is to provide a conveyor unit, a conveyor system and a plant of the type mentioned at the outset, which operates more economically and, at the same time, efficiently.

SUMMARY OF THE INVENTION

This object may be achieved in a conveyor unit of the type mentioned at the outset in that the conveyor unit is movable and comprises a chassis and a coupling device which is connected to the chassis and is arranged in such a way that it cooperates with floor regions of the vehicle body which is aligned with its roof at the top.

According to the invention, the conveyor unit therefore acts directly on a vehicle body without this latter having to be secured to a skid for transportation. It is therefore possible to reduce the number of skids required, since a certain number of skids only have to be provided for the treatment stations in which the vehicle body needs to be secured to a skid. It is also possible to dispense with skids completely, at least in individual treatment zones or regions thereof, as long as the type of treatment permits this.

It is favourable if the coupling device comprises a plurality of coupling elements which can be moved between a load-carrying position and an idle position. In their load-carrying position here, the coupling elements preferably project beyond the clear outer contour of the conveyor unit as seen from above and, in the idle position, are located within the lateral clear outer contour of the conveyor unit as seen from above, i.e. within the delimitation of the conveyor unit to the right and left with respect to its direction of travel. Therefore, the space occupied by unladen conveyor units can be kept small. Moreover, conveyor units with their coupling elements in their idle position can be moved towards other conveyor systems in space-saving manner and can receive a vehicle body from the other conveyer systems there after the coupling elements have been brought into their load-carrying position.

In structurally favourable manner, the coupling elements are constructed as load-carrying bars.

It is particularly advantageous here if the load-carrying bars are mounted such that they can be pivoted in a horizontal plane by means of a pivot drive. In this case, the load-carrying bars swing preferably outwards into their load-carrying position.

It is moreover advantageous if the coupling elements can be moved vertically between a lowest level and a highest level. This takes into account the idea of receiving a vehicle body from another conveyor system or transferring a vehicle body to another conveyor system.

In this case, it is particularly favourable if the coupling device is arranged in such a way that it cooperates with the floor regions of the vehicle body in or on which standardised holding components of the vehicle body are not present, said vehicle body being aligned with the roof at the top. The vehicle body can therefore be removed by a standardised skid, for example, or placed onto such a skid.

The above-mentioned object may be achieved in a conveyor system of the type mentioned at the outset in that at least one conveyor unit with some or all of the features explained above is present.

Reliable route-guidance of the conveyor unit or a plurality of conveyor units is ensured if the at least one conveyor unit can be moved on a rail system.

It is advantageous for a conveyor system of this type if it comprises a plurality of individually controllable conveyor units. It is thus possible to move different vehicle bodies individually by means of a respective conveyor unit.

With regard to the plant of the type mentioned at the outset, the above-mentioned object with the corresponding advantages may be achieved in that the plant comprises a conveyor system of this type with some or all of the features mentioned with reference to it.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is explained in more detail below with reference to the drawings, which show:

FIGS. 7A, 7B, 7C, 7D front views of a conveyor unit wherein the load-carrying bars thereof are shown in different operating positions;

FIG. 10 a detail from FIG. 9, on an enlarged scale, in which the conveyor unit shown therein can be seen in greater detail.

DETAILED DESCRIPTION OF THE PRESENT INVENTION

Figure 1:
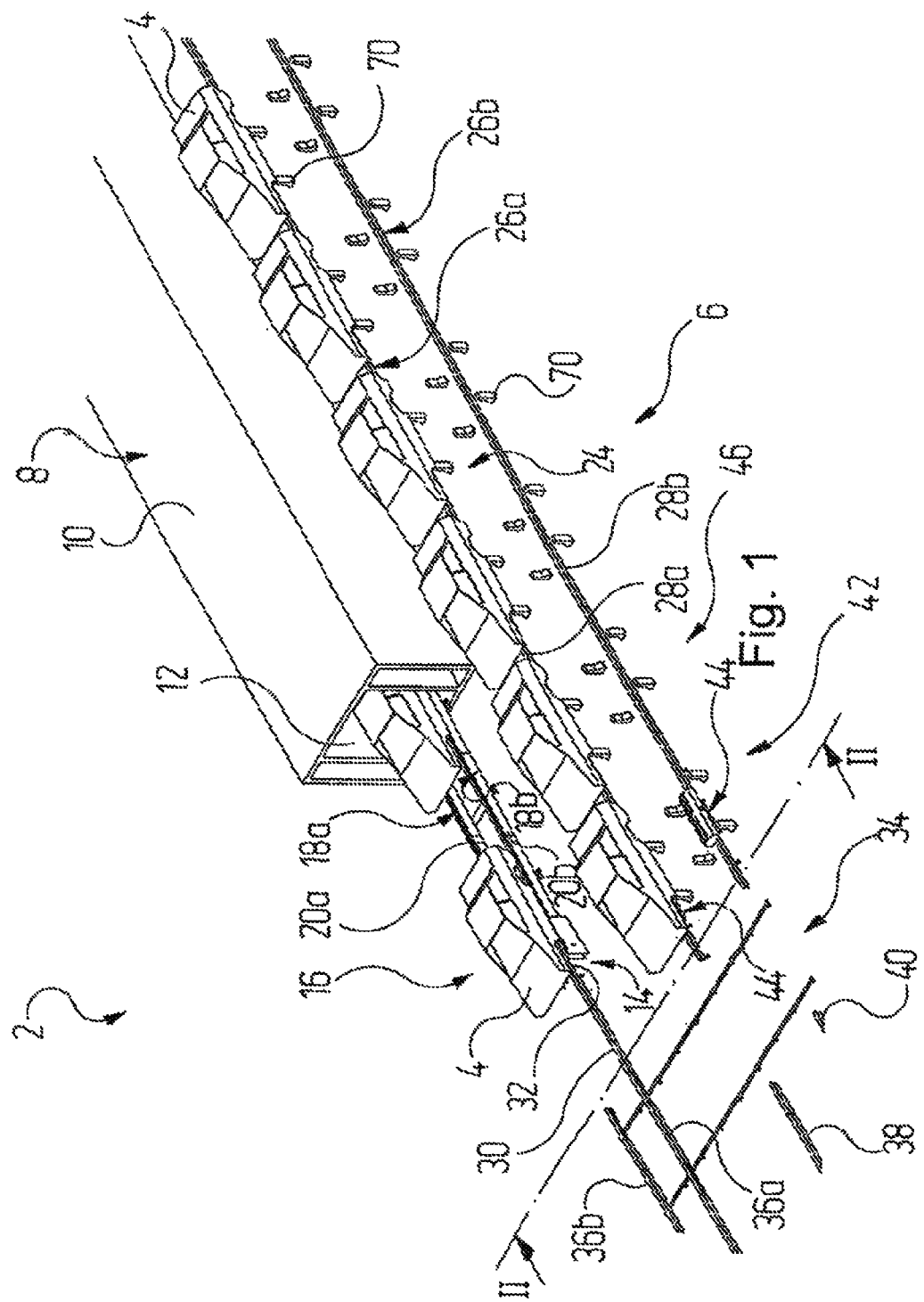
FIG. 1 a perspective illustration of part of a plant for treating vehicle bodies, in which these are conveyed by means of a conveyor system, wherein a section of a drier, a delivery end of a chain conveyor leading through the drier, a buffer zone of the conveyor system with two buffer lines for vehicle bodies and a plurality of conveyor units which can be moved on rails are shown.
Figure 2:
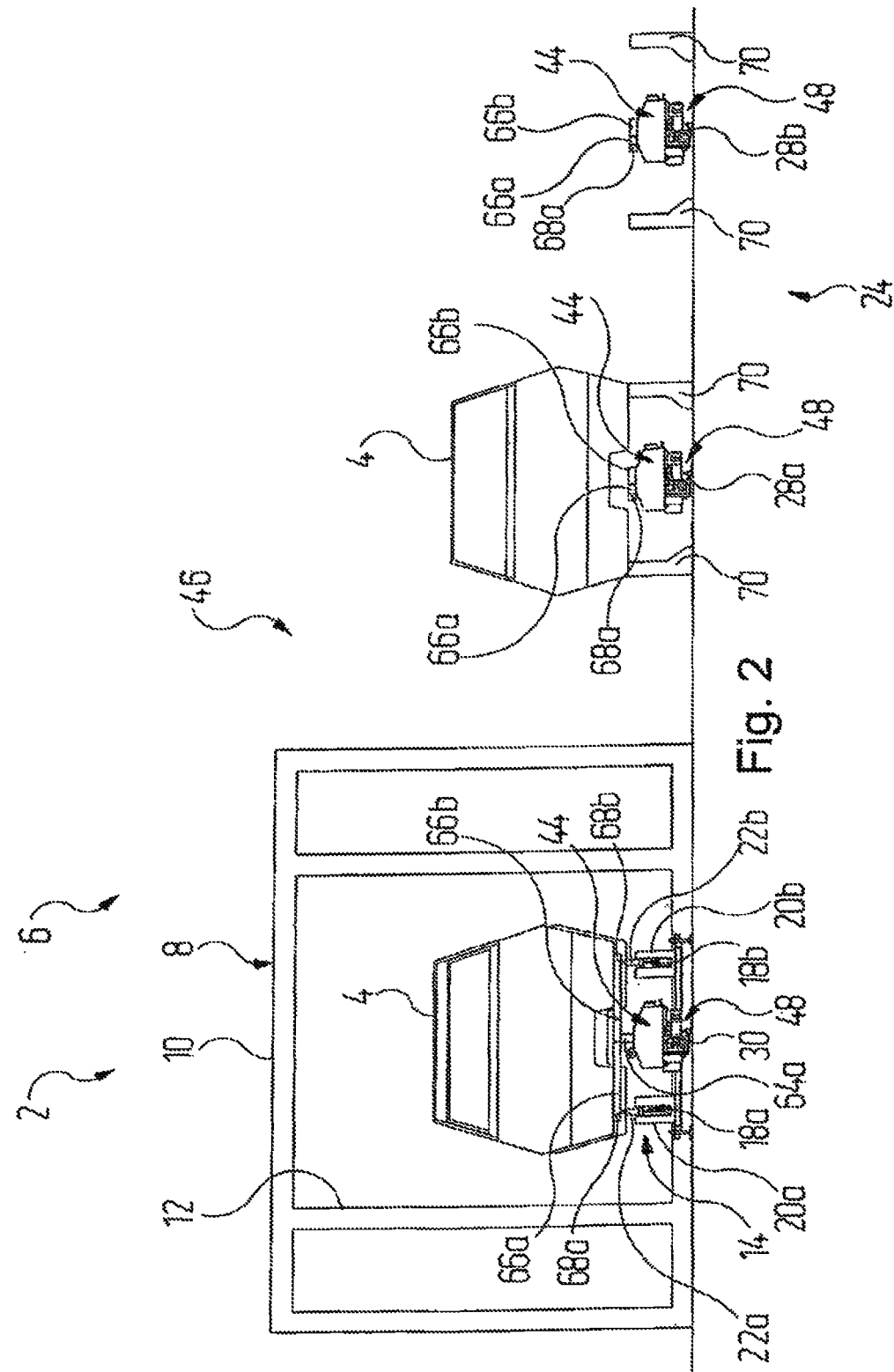
FIG. 2 a section of the plant of FIG. 1 along the section line II-II therein, with a view of the drier and the buffer zone.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 shows a sub-region of a plant 2 for treating vehicle bodies 4. In the plant 2, the vehicle bodies 4 are transported between, and sometimes also within, individual treatment stations, such as bodyshell-work, paint and assembly stations, by means of a conveyor system which is denoted as a whole by 6.

By way of example of a treatment station, FIG. 1 shows a drier 8 having a drier housing 10 which delimits a drying tunnel 12. In the drier 8, paint is dried in a manner known per se on vehicle bodies 4 which have been coated with this paint in a prior operating step in a paint station which is not shown specifically.

The vehicle bodies 4 to be dried are conveyed through the drying tunnel 12 of the drier 8 by means of a chain conveyor 14, i.e. not by the conveyor system 6. FIG. 1 shows a delivery end 16 of the chain conveyor 14, at which the vehicle bodies 4 arrive after passing through the drying tunnel 12.

The chain conveyor 14 comprises two conveyor chains 18a, 18b, which revolve parallel to one another and are guided in a respective guide profile 20a, 20b. The conveyor chains 18a, 18b carry support pins 22a, 22b with them which cooperate with standardised holding components on the vehicle bodies 4, which holding components are mentioned at the outset and are in the form of holding plates on the vehicle-body floor which are each provided with an opening. The support pins 22a, 22b can engage in these openings with their conical ends.

The spacing between two adjacent support pins 22a, 22b of each conveyor chain 18a, 18b is selected so that two adjacent support pins 22a, 22b match two correspondingly arranged and dimensioned holding components of the vehicle body 4 in each case so that a vehicle body 4 can be placed on the conveyor chains 18a, 18b in such a way that it rests on two support pins 22a and 22b on each and therefore on four support pins 22a, 22b in total.

FIG. 1 shows, spatially adjacent to the drier 8, a buffer zone 24 of the plant 2 which belongs to the conveyor system 6. In a buffer zone of this type, vehicle bodies 4 which have already been processed or treated or those which have not been processed or treated are parked in a waiting position before they are optionally supplied to further treatment stations. It is thus possible to maintain a constant throughput rate for a plurality of treatment stations served by the conveyor system 6.

The buffer zone 24 shown in the present exemplary embodiment comprises two mutually parallel, linear buffer lines 26a, 26b which are routed through a first single-track buffer rail 28a or through a second single-track buffer rail 28b.

Extending parallel to the buffer rails 28a, 28b, there is a first single-track conveyor rail 30 which has a receiving end 32, which projects centrally between the guide profiles 20a, 20b and therefore centrally between the conveyor chains 18a, 18b of the chain conveyor 14 into the delivery end 16 of this latter.

The conveyor system 6 moreover comprises a transverse rail pair 34, which extends at a right angle to the buffer rails 28a, 28b of the buffer lines 26a, 26b and the first conveyor rail 30. Linear rail segments, of which two rail segments 36a, 36b are shown in FIG. 1, can be moved on the transverse rail pair 34 in a manner known per se.

The rail segments 36a, 36b can complete the first conveyor rail 30 and enable the first buffer rail 28a to be connected to a second conveyor rail 38 and the second buffer rail 28b to be connected to a third conveyor rail 40 which lead accordingly to further treatment stations.

At their end which is remote from the transfer rail pair 32, the buffer rails 28a, 28b of the buffer lines 26a, 26b merge into conveyor rails which are not provided with a specific reference numeral.

All the buffer and conveyor rails 28a, 28b, 30, 38, 40 mentioned as well as the rail segments 36a, 36b are constructed as I-profiles and, together with the transverse rail pair 34, are part of a rail system which is denoted as a whole by 42. The rail system 42 comprises still further rail lines which are not shown and connects the above-mentioned different treatment stations to one another, with all rails being mounted on the floor of the plant.

A plurality of conveyor units 44 move on the rail system 42. When a rail S, as represented in FIGS. 7A to 7D, is referred to below, then this can be in the form of a buffer rail 28a, 28b, a conveyor rail 28a, 28b, 30, 38, 40, a rail segment 36a, 36b or other structurally similar rails of the rail system 42.

Each conveyor unit 44 can be moved individually as a separate unit in both directions along a respective rail S on which a particular conveyor unit 44 is located. The number of conveyor units 44 is adapted to the plant 2 and the conveyor units 44 provided together form a drive system 46 which is only shown in FIG. 1.

Each conveyor unit 44 has a chassis 48 which reaches around the rail S and supports rollers (not shown here) which are arranged in the interior of a housing 50 and roll along the upper side of the rail S. These rollers take up the load to be carried by the conveyor unit 44.

Figure 6:
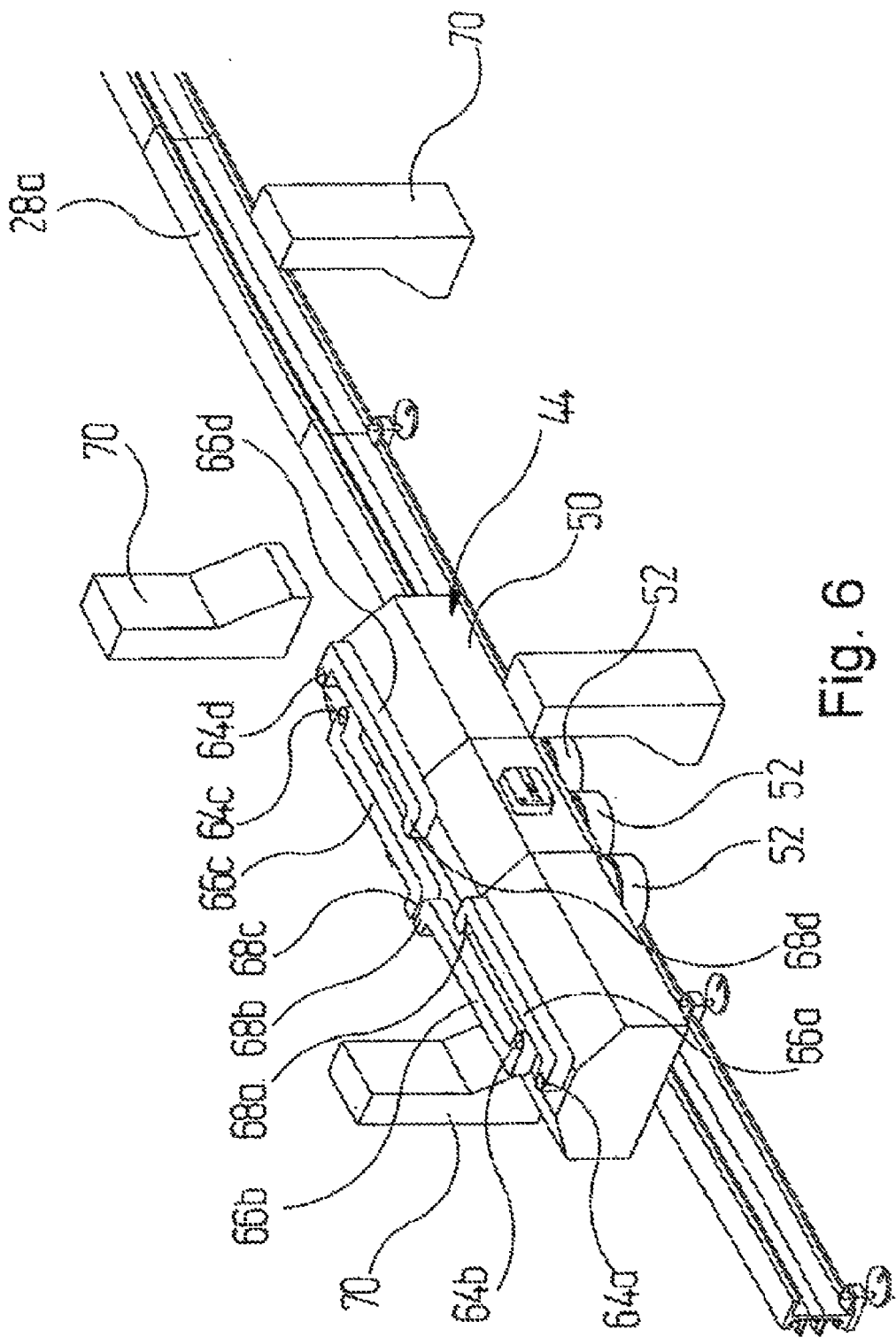
FIG. 6 a perspective view, corresponding to FIG. 5, of a conveyor unit on a buffer line of the buffer zone, wherein the four load-carrying bars of the conveyor unit assume an idle position.

The conveyor unit 44 moreover engages in the I-profile of the rail S by means of three pressure rollers 52 (see FIG. 6) which each form a compact assembly together with a hub drive. The pressure rollers 52 run parallel to a horizontal transport plane and are each rotatable about an axis which is perpendicular to said plane, i.e. a vertical axis.

Figure 3:
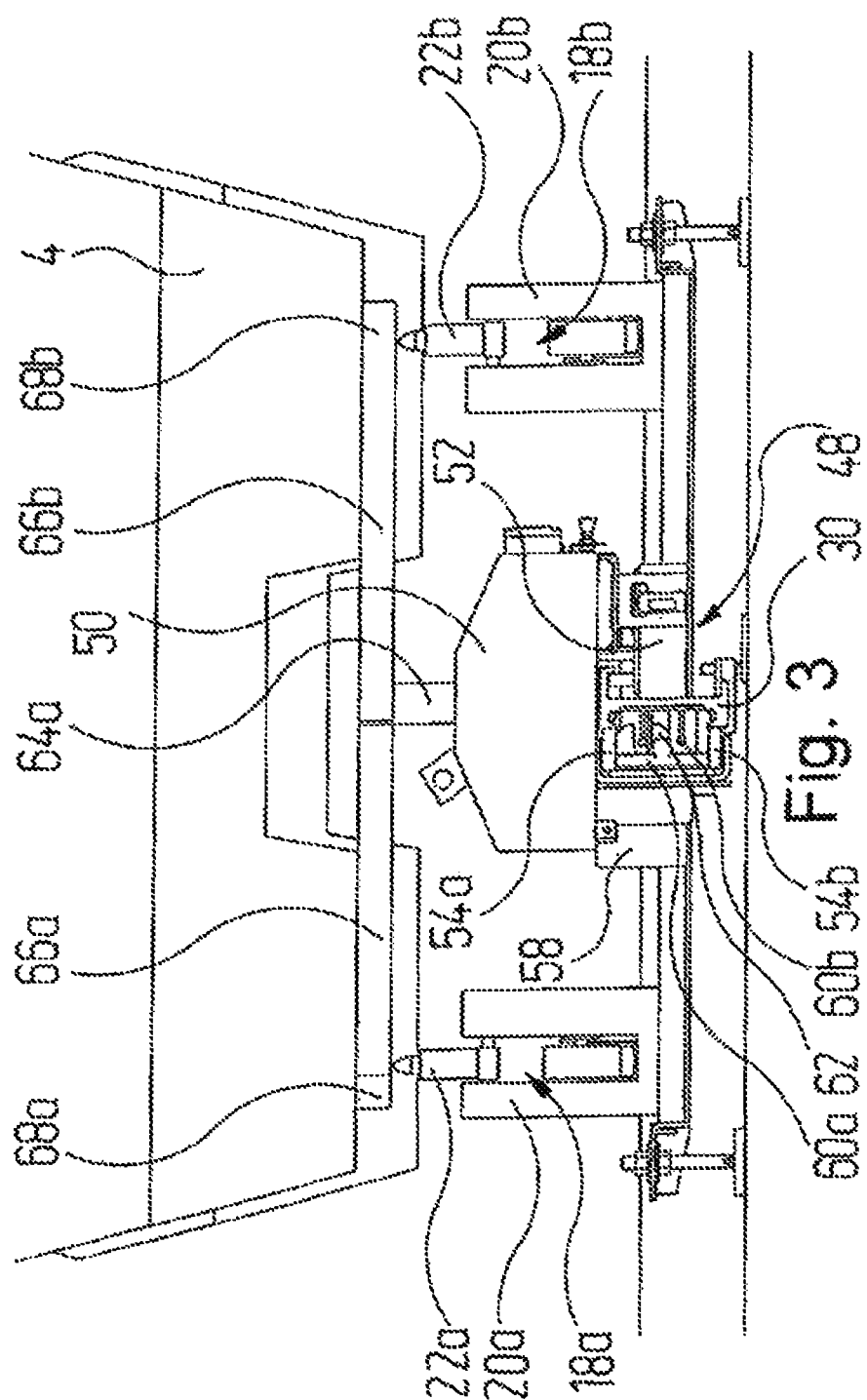
FIG. 3 a detail from FIG. 2, on an enlarged scale, in the region of the drier, so that one of the conveyor units can be seen in a view from the front.
Figure 4:
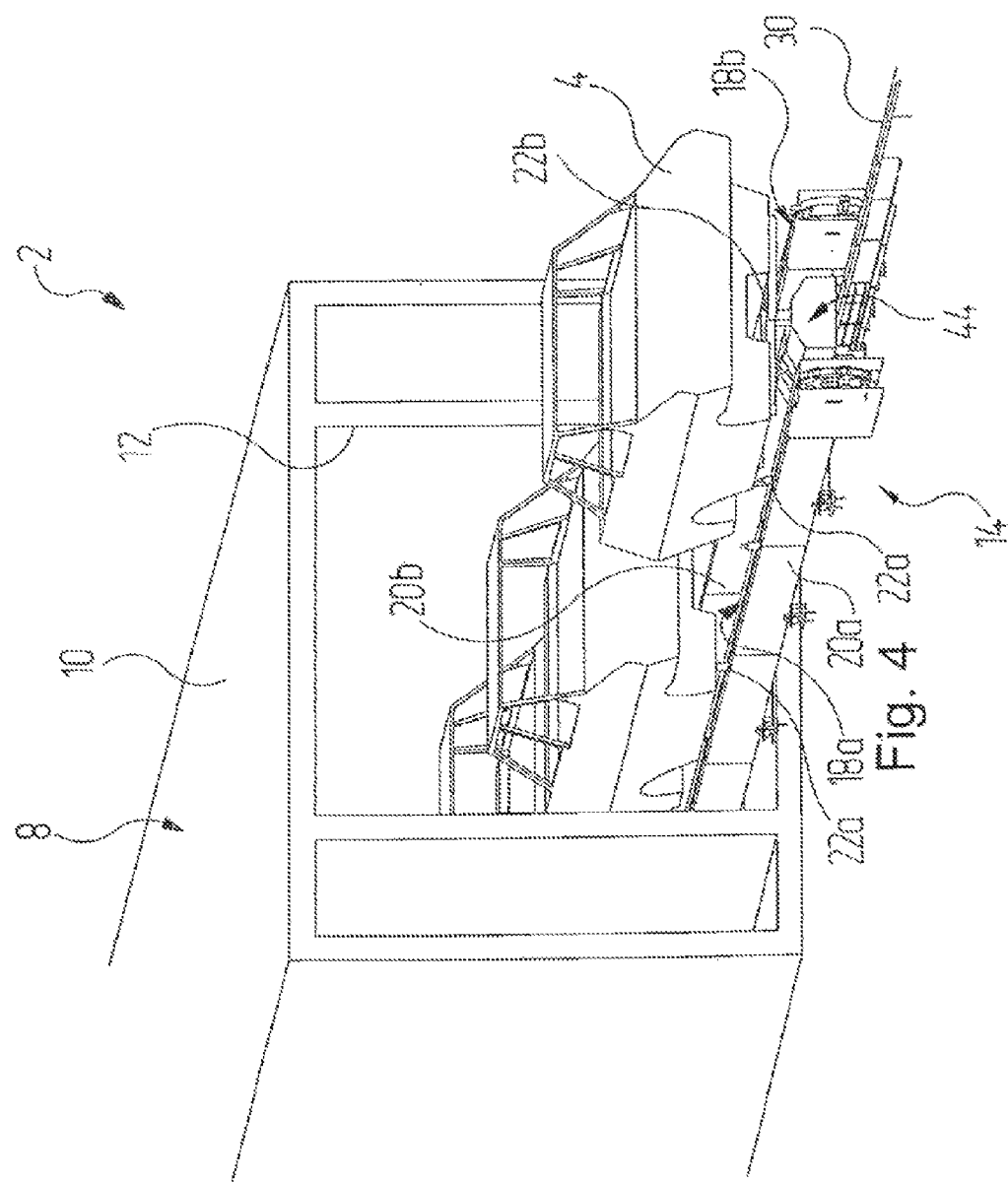
FIG. 4 a perspective view of the delivery end of the chain conveyor, where the vehicle bodies are received by a respective conveyor unit.

Lateral guide rollers 54, 54*b*, which abut against the narrow flanks of the I-profile of a rail S on the opposite side to the pressure rollers 52 of the rail S, prevent the conveyor unit 44 from swinging laterally or tilting. This is shown particularly in FIG. 3.

FIGS. 7A to 7D show the other end face of the conveyor unit 44 as opposed to the one shown in the rest of the Figures. These also show a supporting roller 56 of the conveyor unit 44 which abuts from below against the upper "transverse bar" of the I-profile of the rail S on the side of the lateral guide rollers 54, 54*b*. This prevents the conveyor unit 44 from tilting about an axis perpendicularly to the direction of travel.

The conveyor unit 44 comprises a control means 58 by way of which the conveyor unit 44 is controlled in a manner known per se by means of contact-free data transmission, for example by radio or inductive communication. To this end, the plant 2 comprises a central control which is known per se and is not shown specifically.

In the present exemplary embodiment, line conductors 60*a*, 60*b* are installed laterally along the rails S to supply energy to the conveyor units 44. The line conductors 60*a* and 60*b* refer to a winding which is stretched into a long conductor loop, describing a loop with the line conductor 60*a* as the feed line and the line conductor 60*b* as the return line. Energy is transmitted by way of a coil 62 on the conveyor unit 44, which is arranged in the immediate vicinity of the line conductors 60*a*, 60*b* without contacting these.

It is also possible to provide conductor line systems, which are known per se, or an autonomous energy supply by way of accumulators for the conveyor units 44.

The pressure rollers 52 are controlled by the control means 58, with the conveyor unit 44 moving along the rail S as a result of the friction fit between the pressure rollers 52 and the rail S.

The absolute position of each conveyor unit 44 within the plant 2 can be determined by means of a position-detecting device which is known per se, which also enables the position of a vehicle body 4 which is moved by a particular conveyor unit 44 to be detected.

Projecting upwards out of the top of the housing 48 of the conveyor unit 44 are four rotatable axle journals 64*a*, 64*b*, 64*c*, 64*d*, which are arranged behind one another in the direction of a rail S and are denoted as a whole below by the reference numeral 64. At their end which is remote from the housing 50 of the conveyor unit 44 in each case, these axle journals support pivotable load-carrying bars 66*a*, 66*b*, 66*c*, 66*d* which extend in a horizontal plane. The load-carrying bars 66*a*, 66*b*, 66*c*, 66*d* are denoted as a whole below by the reference numeral 66.

The load-carrying bars 66 serve as coupling elements and each have a support end 68*a*, 68*b*, 68*c*, 68*d* on which a vehicle body 4 can be placed.

The load-carrying bars 66 can be pivoted between a load-carrying position and an idle position. To this end, the conveyor unit 44 carries along a pivot drive (not shown specifically) which is coupled to the axle journals 64 and can be controlled by the control means 58. The axle journals 64 can be rotated about their longitudinal axis by means of the pivot drive.

The pivot drive, the axle journals 64 and the load-carrying bars 66 with their support ends 68 together form a coupling device which is arranged such that it can cooperate with the floor regions of a vehicle body 4 which is aligned with its roof at the top.

Figure 5:
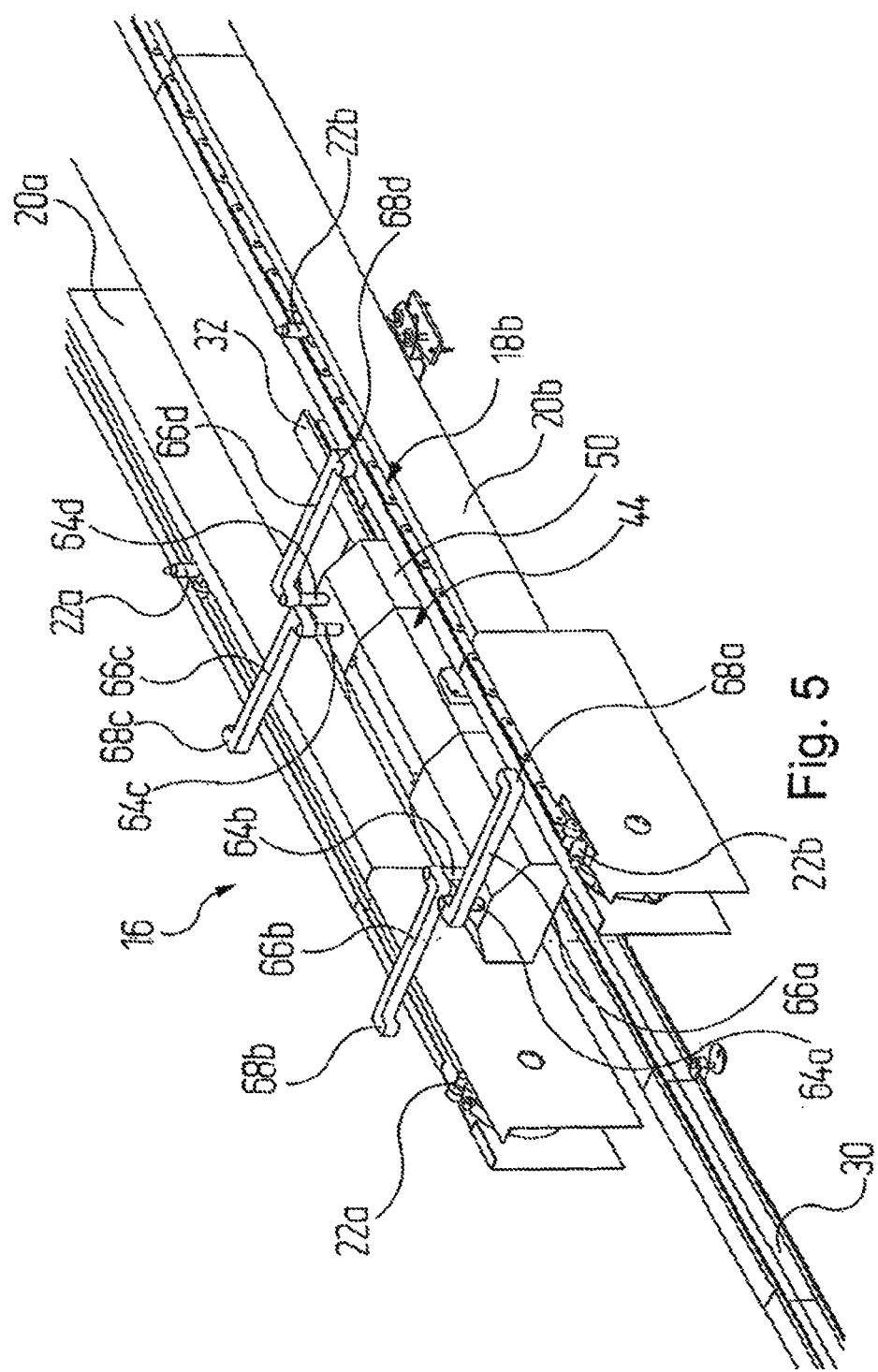
FIG. 5 a perspective view of a conveyor unit in the region of the delivery end of the chain conveyor without a vehicle body, wherein four load-carrying bars of the conveyor unit assume a load-carrying position.

In their load-carrying position, the load-carrying bars 66 project outwards from their housing 50 perpendicularly to the direction of travel of the conveyor unit 44 and, as seen from above, protrude beyond its clear outer contour and therefore beyond the clear outer contour of the conveyor unit 44. This is clearly shown in FIG. 5. In this position of the load-carrying bars 66, a vehicle body 4 can be placed with its door sills on the support ends 68 of the load-carrying bars 66. The load-carrying bars 66 and the support ends 68 are adapted here in terms of their dimensions and geometry to the vehicle body 4 to be conveyed in such a way that they cooperate with floor regions of the vehicle body 4 which are not used by the chain conveyor 14. This means, in particular, that the load-carrying bars 66 do not carry the vehicle bodies 4 at, or by means of, their standardised holding components.

In their idle position, the load-carrying bars 66 are each aligned parallel to the direction of travel of the conveyor unit 44 and are located within the clear outer contour of the housing 50 of the conveyor unit 44 as seen from above. This is clearly shown in FIG. 6.

The load-carrying bars 66 can moreover be moved vertically between a lowest level and a highest level. To this end, the axle journals 64 can be moved in and out of the housing 50 of the conveyor unit 44 by means of a corresponding drive which is carried along by the conveyor unit 44 and is not shown in the Figures.

This is shown in FIGS. 7A to 7D. FIG. 7A shows the conveyor unit 44 with the raised load-carrying bars 66 in their extended load-carrying position. In FIG. 7B, the load-carrying bars 66 are raised, but assume their collapsed idle position. In FIG. 7C, the load-carrying bars 66 are now moved downwards in their extended load-carrying position whereas, in FIG. 7D, they are moved downwards but assume their collapsed idle position. Positions between the lowest and the highest level are also possible. In the load-carrying position, the load-carrying bars can also project from the housing 50 of the conveyor unit 44 at an angle other than 90°. The conveyor unit 44 can therefore be used for different vehicle bodies, and particularly vehicle bodies of varying widths, whereof the door sills are at correspondingly different spacings from another.

The principle of the plant 2 described above, which has the rail system 42 and the drive system 46, is now explained by way of example:

As a starting point, it shall be assumed that the vehicle body 4, which is located at the delivery end 16 of the chain conveyor 14 in FIG. 1, has passed through the drier 8 and the drying procedure has been completed.

In the first buffer line 26*a* of the buffer zone 24, a plurality of vehicle bodies 4 are already parked temporarily and rest with their door sills on bearing blocks 70 which flank the first buffer rail 28*a* on both sides.

Located on the second buffer rail 28*b* is a conveyor unit 44 whereof the load-carrying bars 66 assume their collapsed idle position at the lowest level, as shown in FIG. 7D.

To now remove the vehicle body 4 from the delivery end 16 of the chain conveyor 14, the rail segment 36a is firstly moved from the first conveyor rail 30 to the second buffer rail 28b on the transverse conveyor rail pair 34. The conveyor unit 44 then moves from the buffer rail 28b onto the rail segment 36a. This is now moved back to the first conveyor rail 30, together with the conveyor unit 44 located on it.

The conveyor unit 44 moves into the region of the delivery end 16 of the chain conveyor 14 until it assumes an approximately central position below the vehicle body 4.

The load-carrying bars 66 are now vertically upwards in their idle position into an upper intermediate position until the load-carrying bars are located a short distance above the level of the conveyor chains 18a, 18b of the chain conveyor 14. The load-carrying bars 66 are then swung into their load-carrying position, corresponding to that in FIG. 7C, so that they arrive between the conveyor chains 18a, 18b and the vehicle body 4. The load-carrying bars 66 are now moved into their highest position as shown in FIG. 7A. With this, the load-carrying bars 66 arrive at the door sills of the vehicle body 4, take hold of these and lift them synchronously off the support pins 22a, 22b of the chain conveyor 14.

It is optionally possible for each load-carrying bar 66a, 66b, 66c, 66d to be assigned a separate highest position in order to conform to different support components of a particular vehicle body 4.

The transfer of the vehicle body 4 can take place on the one hand when the chain conveyor 14 is stationary. On the other hand, however, the transfer can be carried out when the chain conveyor 14 is in motion, for which the conveyor unit 44 is moved below the vehicle body 4 synchronously with the rate of advance of this latter.

The vehicle body 4 is now carried completely by the conveyor unit 44. The conveyor unit 44 is then moved together with the vehicle body 4 onto the rail segment 36b. From there, the vehicle body 4 can be conveyed to a further treatment station via that part of the conveyor rail 30 which leads away from the drier 8.

If the buffer zone 24 is supplied and emptied on a "first in-first out" basis, as is often the case in buffer zones, the vehicle body 4 is conveyed to the second buffer line 26b. For this to take place, the rail segment 36a is moved back to the second buffer rail 28b by way of the transverse conveyor rail pair 34 and thereby carries the conveyor unit 44 and the vehicle body 4 with it.

The conveyor unit 44 then moves with the vehicle body 4 onto the second buffer rail 28b until the vehicle body 4 comes to lie in a centred position above the last four mutually associated bearing blocks 70 which are still free. The load-carrying bars 66 of the conveyor unit 44 are then moved back into their lowest position, whereby the vehicle body 4 is deposited on the corresponding bearing blocks 70 and received by these. The load-carrying bars 66 are then brought into their collapsed idle position.

A vehicle body 4 is removed from the buffer zone 24 accordingly: A conveyor unit 44 is moved into the desired position below a particular vehicle body 4 to be conveyed and the load-carrying bars 66 are swung into the load-carrying position and raised. There is no need for the load-carrying bars 66 to pause at an intermediate level here.

A vehicle body 4 to be dried is likewise moved analogously onto the chain conveyor 14: A conveyor unit 44 carrying a vehicle body 4 moves for this purpose into the loading end, which is opposite the delivery end 16 and is not shown here, until the vehicle body is positioned above the conveyor chains 18a, 18b in such a way that the openings in the holding components of the vehicle body 4 are vertically aligned with the support pins 22a, 22b of the conveyor chains 18a, 18b. The load-carrying bars 66 of the conveyor unit 44 are now moved into a lower position. During this downward movement, the free ends of the support pins 22a, 22b engage in the corresponding openings in the vehicle body 4 and this latter is deposited on the support pins 22a, 22b. The load-carrying bars 66 are then brought into their collapsed idle position and moved into the lowest position. The conveyor unit 44 is then moved to a further destination whilst the vehicle body 4 is now moved through the drying tunnel 12 by means of the chain conveyor 14. The transfer can also take place here when the chain conveyor 14 is moving.

Vehicle bodies 4 which are to be parked temporarily in the buffer zone can of course also come from treatment stations other than the drier 8.

Figure 9:
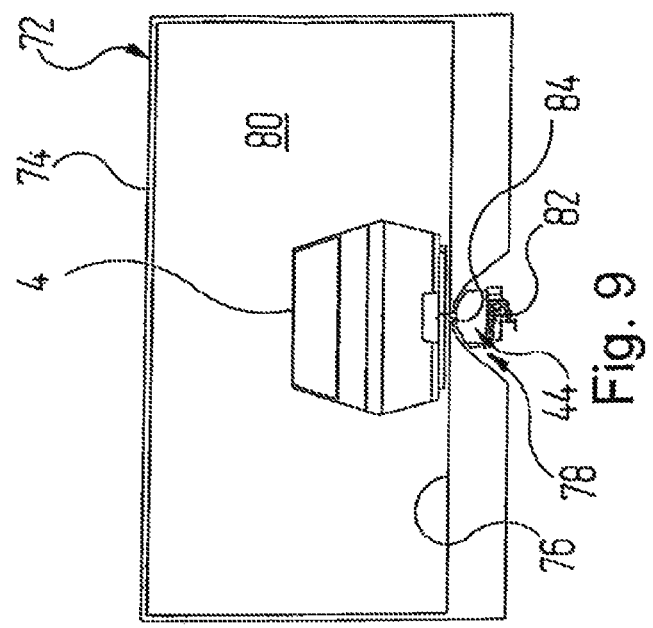
FIG. 9 a view from behind of the treatment station of FIG. 8 from the direction of the arrow IX therein.
Figure 8:
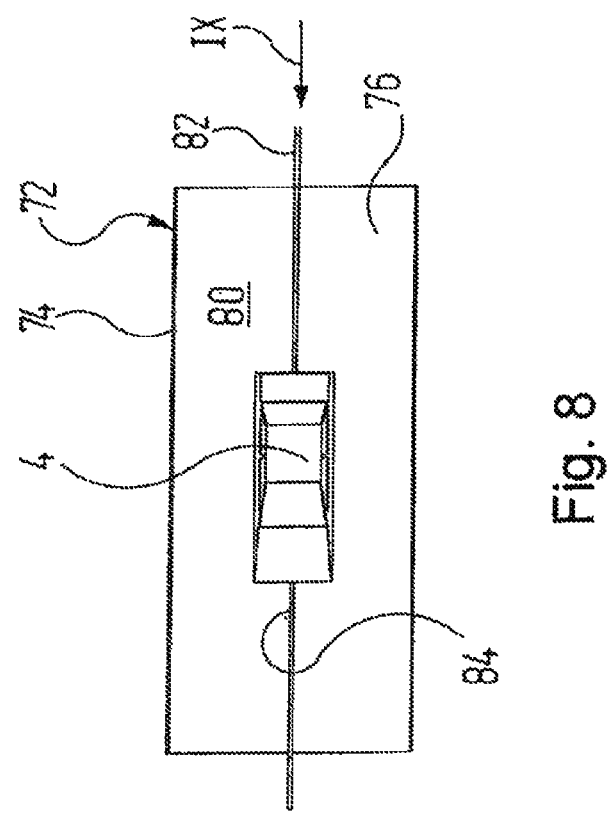
FIG. 8 a view from above of a treatment station through which a vehicle body is conveyed on a conveyor unit.

The plant 2 also comprises, for example, treatment stations which do not have a separate conveyor system associated with this particular treatment station. This is shown in FIGS. 8 and 9, in which a treatment station 72 is shown through which a vehicle body 4 is conveyed with the aid of a conveyor unit 44. The treatment station 72 can be, for example, an audit station in which the result of a prior treatment is evaluated.

The treatment station 72 comprises a housing 74 with a floor 76 which separates a conveying area 78 below the floor 76 from a treatment area 80 above the floor 76.

A conveyor rail 82, with is structurally similar to the rails described above, extends through the conveying area 78. Vertically above the conveyor rail 82, the floor 76 of the treatment station 72 has a continuous slot 84 through which the axle journals 64 of the conveyor unit 4 can project when the load-carrying bars 66 are in the highest position so that the load-carrying bars 66 are arranged above the floor 76 in the treatment area 80.

It is thus possible for the vehicle body 4 to be moved through the treatment station 72 whilst people are able to move in the vicinity of the vehicle body 4 on the floor 76 of the treatment station.

There may be treatment stations in which the atmosphere in the conveying area makes it impossible to supply energy and control the conveyor units 44 by way of the line conductors 60a, 60b, or at least limits this. In a modification, it is therefore possible to provide for the conveyor units 44 to be coupled to a towing system, for example a chain revolving in the conveying area 78 or a rope, which can be driven outside the conveying area 78.

In a modification, the conveyor unit 44 is designed such that curved paths are also possible. In this case, instead of the pressure rollers 52 guided on the side of the rails S, for example, it is possible to provide a drive roller which runs along the upper side of the rails S and takes up the load at the same time.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A conveyor unit for conveying vehicle bodies comprising:

a conveyor unit which is movable and which comprises a chassis and a coupling device which includes at least one coupling element which is rotationally connected to the chassis and is arranged in such a way that the coupling device cooperates with floor regions of a vehicle body which are aligned with a roof of the vehicle body at a top of the vehicle body, wherein the conveyor unit is movable along a one-track rail and the chassis supports drivable pressure rollers, with the conveyor unit moving along the one-track rail as a result of friction between the pressure rollers and the one-track rail.

2. The conveyor unit according to claim 1, wherein the coupling device comprises a plurality of coupling elements which are movable between a load-carrying position and an idle position.

3. The conveyor unit according to claim 2, in the load-carrying position as seen from above, the coupling elements project beyond a clear outer contour of the conveyor unit and, in the idle position as seen from above, are located within a lateral clear outer contour of the conveyor unit.

4. The conveyor unit according to claim 1, wherein the coupling elements are load-carrying bars.

5. The conveyor unit according to claim 4, wherein the load-carrying bars are mounted such that they are pivotable in a horizontal plane by a pivot drive.

6. The conveyor unit according to claim 1, wherein the coupling elements are movable vertically between a lowest level and a highest level.

7. The conveyor unit according to claim 1, wherein the coupling device is arranged in such a way that the coupling device cooperates with floor regions of the vehicle body in or on which standardized holding components of the vehicle body are not provided, said vehicle body being aligned with the roof of the vehicle body at the top of the vehicle body.

8. A conveyor system for conveying vehicle bodies, comprising:
at least one conveyor unit which is movable and which comprises a chassis and a coupling device which includes at least one coupling element which is rotationally connected to the chassis and is arranged in such a way that the coupling device cooperates with floor regions of a vehicle body which are aligned with a roof of the vehicle body at a top of the vehicle body, wherein the conveyor unit is movable along a one-track rail and the chassis supports drivable pressure rollers, with the conveyor unit moving along the one-track rail as a result of friction between the pressure rollers and the one-track rail.

9. The conveyor system according to claim 8, wherein the at least one conveyor unit is movable on a rail system.

10. The conveyor system according to claim 8, further comprising: a plurality of individually controllable conveyor units.

11. A plant for treating vehicle bodies, in which vehicle bodies are conveyed between and/or within treatment stations by a conveyor system, comprising:
a conveyor system having at least one conveyor unit which is movable and which comprises a chassis and a coupling device which includes at least one coupling element which is rotationally connected to the chassis and is arranged in such a way that the coupling device cooperates with floor regions of a vehicle body which are aligned with a roof vehicle body at a top of the vehicle body, wherein the conveyor unit is movable along a one-track rail and the chassis supports drivable pressure rollers, with the conveyor unit moving along the one-track rail as a result of friction between the pressure rollers and the one-track rail.

* * * * *